(12) United States Patent
Otani (10) Patent No.: US 10,209,786 B2
(45) Date of Patent: Feb. 19, 2019

(54) PROJECTOR SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/709,871

(22) Filed: Sep. 20, 2017

(65) Prior Publication Data
US 2018/0088688 A1 Mar. 29, 2018

(30) Foreign Application Priority Data

Sep. 29, 2016 (JP) .................................. 2016-190772

(51) Int. Cl.
| | |
|---|---|
| G06F 3/042 | (2006.01) |
| G06F 3/0354 | (2013.01) |
| H04N 9/31 | (2006.01) |
| G06F 3/038 | (2013.01) |
| G03B 21/14 | (2006.01) |

(52) U.S. Cl.
CPC ......... G06F 3/03542 (2013.01); G03B 21/14 (2013.01); G06F 3/0386 (2013.01); G06F 3/0425 (2013.01); H04N 9/3179 (2013.01); H04N 9/3194 (2013.01); *G06F 2203/0381* (2013.01)

(58) Field of Classification Search
None
See application file for complete search history.

(56) References Cited

U.S. PATENT DOCUMENTS

| | | | |
|---|---|---|---|
| 2006/0197756 A1* | 9/2006 | Sun | G06F 3/042 345/179 |
| 2014/0306939 A1* | 10/2014 | Tamura | G06F 3/0418 345/178 |
| 2015/0208050 A1 | 7/2015 | Pawlak et al. | |

FOREIGN PATENT DOCUMENTS

| | | |
|---|---|---|
| JP | 2009-064375 A | 3/2009 |
| JP | 2015-159524 A | 9/2015 |

* cited by examiner

*Primary Examiner* — Nicholas J Lee
(74) *Attorney, Agent, or Firm* — Oliff PLC (57) ABSTRACT

An imaging section receives, as detection light, the components within a wavelength band different from the wavelength band contained in projection light (image light) that is light containing a visible wavelength band. As a result, even when the detection light and the projection light are each formed of light containing a visible wavelength band, the imaging section can reliably distinguish the detection light from the projection light and therefore detect only the detection light.

8 Claims, 11 Drawing Sheets

FIG.13 though the detection light, which may be visible light, can reach the imaging section. Therefore, image light components unnecessary for the detection light do not enter the imaging section, whereby unnecessary incident light can be suppressed.

PROJECTOR SYSTEM

BACKGROUND

1. Technical Field

The present invention relates to a projector system for achieving what is called an interactive projector that allows writing operation by detecting the tip of a pen or any other object present on a projection screen and reflecting a result of the detection in the content of a projection image.

2. Related Art

There is a known interactive projector that provides an interactive function by employing a configuration in which a light outputting apparatus that outputs infrared light in such a way that an infrared light layer is formed, for example, roughly over a projection screen (screen) is provided separately from a projection mechanism of the projector, causing the infrared light from the light outputting apparatus to be reflected off the tip of a pointing element (fingertip, for example), and detecting the reflected light with an imaging section to detect pointing operation performed by the pointing element (see JP-A-2015-159524, for example). It is further known that the pointing element (light emitting pen) itself may emit infrared light and the imaging section may detect the emitted infrared light (see JP-A-2015-159524). In the configuration described above, to identify the light emission position where the pointing element emits the light, infrared light is so produced, as light having a wavelength out of the visible wavelength band, as to be distinguished from the light projected from the projector (visible light). That is, the imaging section detects the infrared light for identification of the pointing element.

Achievement of the interactive projector described above rests on the premise that positioning (calibration) for identification of the infrared light emission position representing the position of the pointing element on the projection screen has been performed. To perform the positioning (calibration), however, an attempt to associate the position on a pattern image projected from the projector, for example, by using visible light with the infrared light emission position of the pointing device on the basis of imaging information acquired by an imager that accompanies the projector requires the imager to be a high-performance imager capable of suppressing chromatic aberrations over a wide wavelength band so that the visible light and the infrared light can both be captured with no defocus or other undesirable effects.

Further, since infrared light is directly invisible to human eyes, a person who operates the pointing element and a person who views the screen on which the projector performs projection cannot perform visual checking unless information indirectly written by using an interactive function is displayed.

If the infrared light used in the situation described above is replaced with visible light, the visible light for the positioning described above is mixed up with the light projected from the projector (image light), which is also visible light, resulting in no distinction between the pointing position and a displayed image.

SUMMARY

An advantage of some aspects of the invention is to achieve an interactive projector and particularly provide a projector system that uses light containing a visible wavelength band as detection light representing the position of a pointing element but still allows reliable distinction between the detection light and image light.

A projector system according to an aspect of the invention includes a light source, a light modulator that modulates light from the light source to form image light, a projection optical system that projects the image light from the light modulator, and an imaging section that receives components within a visible wavelength band different from a wavelength band contained in the image light projected by the projection optical system, the components received as detection light for detection of a position on a projection image projected by the image light projected via the projection optical system.

In the projector system described above, the imaging section receives, as the detection light for detection of a position on a projection image projected by the image light projected via the projection optical system, components within a visible wavelength band different from the wavelength band contained in the image light projected by the projection optical system to detect the position in the projection image, and the detected position is reflected in the content of the projection image, whereby what is called an interactive projector capable of writing operation can be achieved. Further, in the configuration that achieves an interactive projector, even when the detection light and the image light are each formed of light containing a visible wavelength band, the imaging section can reliably distinguish the detection light from the image light. In addition to this, since the detection light, which is the target to be detected by the imaging section, is formed of light that falls within a visible wavelength band, the imaging section, for example, does not need to be configured to have performance capable of capturing not only visible light but infrared light, whereby the imaging section can be compact and simplified. Further, when light outputted from a pointing element, which is a target to be detected, (detection light DL) is visible light, a person can directly visually recognize the light outputted from the pointing element. Moreover, even in an aspect in which the shape of a finger is recognized and the position pointed by the finger is acquired, for example, an aspect using a stereo camera, it is not necessary to radiate infrared light for separation of the shape of the finger from the image light, which is visible light, whereby an infrared light illuminator or any other similar device is not required.

According to a specific aspect of the invention, the projection optical system throws light containing the visible wavelength band from which at least part thereof is lacked. In this case, a visible wavelength band that is not contained in the light thrown via the projection optical system is present, whereby the visible wavelength band can be used as the detection light.

According to another aspect of the invention, the projector system described above further includes a cut-off filter that is disposed in an optical path from the light source to the projection optical system and cuts off light containing the same wavelength band as a wavelength band to be received as the detection light by the imaging section. In this case, a situation in which the light thrown via the projection optical system contains the same wavelength band as the wavelength band to be received as the detection light can be avoided.

According to a still another aspect of the invention, the imaging section includes an optical filter that cuts off at least light containing the wavelength contained in the image light.

In this case, the optical filter allows reliable detection of only the detection light, which is the target to be detected.

According to a still another aspect of the invention, the projector system described above further includes a projector control section that identifies an image projection position based on information on the image light acquired by the imaging section and a light emission position where the detection light detected by the imaging section is emitted and performs image projection control based on a relationship between the identified positions. In this case, the projector control section allows an interactive projector action in which the image projection position and the light emission position are associated with each other so that the position of the tip of a light emitting pen or any other object as the pointing element is detected and the motion of the tip of the pen is written on a projection screen. The projector control section conceivably has a variety of aspects, for example, an aspect in which the projector control section is incorporated in a projector main body and an aspect in which a PC connected to the projector main body functions as the projector control section.

According to a still another aspect of the invention, the projection optical system performs image projection that reflects information on a light emission position where the detection light detected by the imaging section is emitted. In this case, reflecting information on the light emission position where the detection light is emitted allows an interactive projector action in which the information is written on a projection screen on the basis of the light emission position where the detection light is emitted.

According to a still another aspect of the invention, in the projector system described above, calibration is so performed that image light for projecting a pattern image is projected and pixels involved in light modulation in which the light from the light source is modulated are associated with pixels of a light receiving device in the imaging section based on information produced by the imaging section having received the image light representing the pattern image. In this case, the calibration described above allows image position associating operation for interactive image projection.

According to a still another aspect of the invention, the projector system described above further includes a pointing element that produces light containing a wavelength band that is not contained in the image light projected via the projection optical system. In this case, receiving and detecting, as detection light, the components of light outputted from the pointing element allows an interactive projector action.

According to a still another aspect of the invention, the projector system described above further includes a mode setting accepting section that activates the imaging section and accepts an instruction that instructs setting of an interactive mode in which an image corresponding to a result of reception of components within a specific wavelength band received by the imaging section is displayed. In this case, when the instruction that instructs setting of the interactive mode is accepted, an interactive projector action can be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector system according to an embodiment of the invention will be described below with reference to the drawings.

Figure 1:
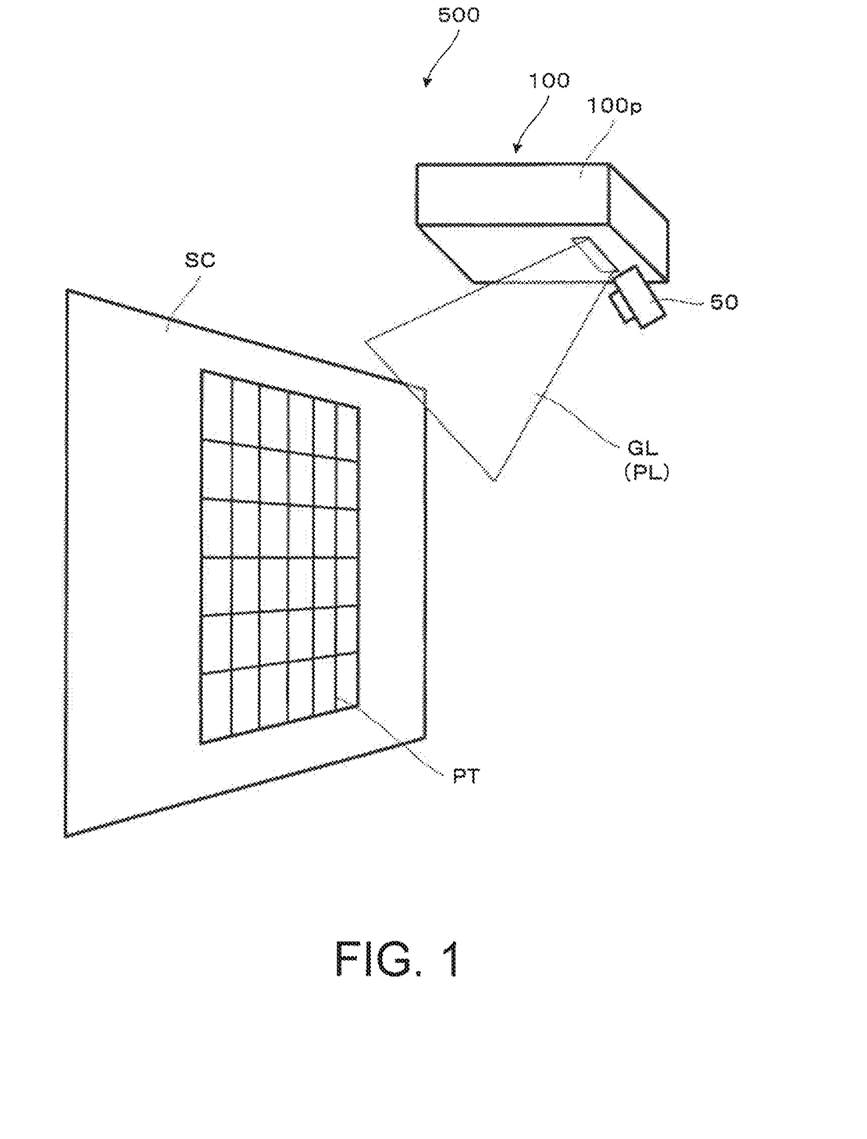
FIG. 1 shows a schematic configuration of a projector system according to an embodiment and specifically shows projection of a pattern image at the time of calibration.

A projector system 500 shown in FIG. 1 and other figures is formed of a projector 100, which projects projection light PL for image projection. An irradiated area PLa, which is an area irradiated with the projection light PL, is formed, for example, on a screen SC. Although not shown, the projector system 500 further includes, in addition to the projector 100, a PC or any other apparatus connected thereto and therefore allows image manipulation in an interactive situation in which the PC carries out a variety of processes as required to allow writing operation performed on the display screen in the irradiated area PLa. In the projector system 500, the projector 100 is a shortthrow projector that is installed obliquely above the screen SC and performs proximity projection toward the screen SC obliquely below the projector 100. The projector 100 is formed of a projector main body 100p, which is a main body for the image projection, and an imaging section 50.

Figure 6:
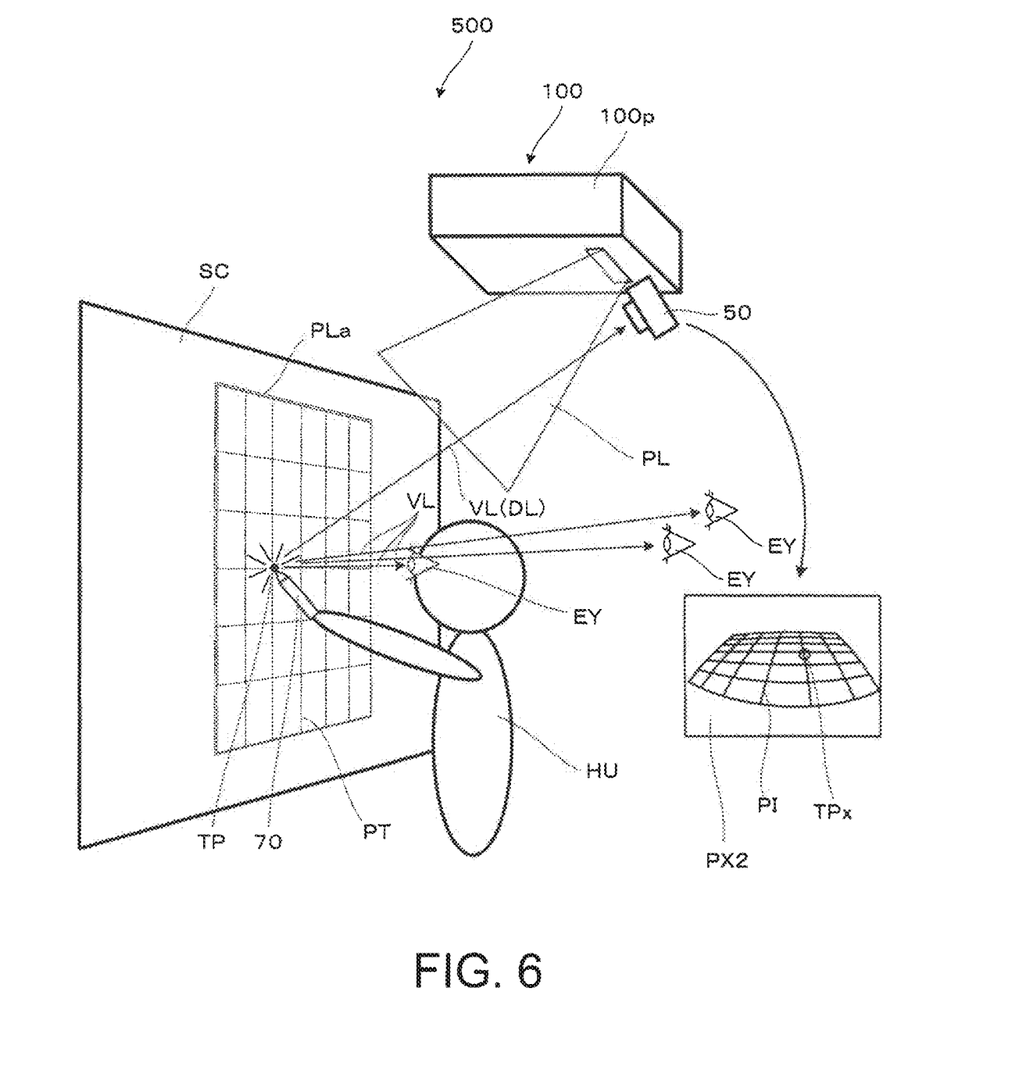
FIG. 6 shows an example of image projection in an interactive situation.

The projector main body 100p projects the projection light PL, which is image light that is a combination of light fluxes containing the visible wavelength band, toward the screen SC to form a projection image (color image), as shown in FIG. 1 or 6. FIG. 1 particularly shows, among a variety of types of image projection performed by the projector main body 100p, projection of a pattern image used at the time of calibration that is a positioning process carried out as a premise that allows what is called interactive image projection, and FIG. 6 shows image projection in an interactive situation as an example of image projection at the time of actual use of the projector system 500 after the calibration. In the present embodiment, it is first assumed in the description that a pattern image PT, which indicates the range of video images displayed on the screen SC by image projection (projection) performed by the projector main body 100p, is projected by using patterned image light GL formed of light containing the green wavelength band out of the visible wavelength band contained in the projection light PL, which is the image light, as illustrated in FIG. 1. The imaging section 50 receives part of the components of the patterned image light GL to acquire image information on the pattern image PT and identifies the position where the image is projected on the basis of the information. Further, as illustrated in FIG. 6, on the screen SC or in the vicinity thereof, in addition to the projection light PL described above, visible light containing a wavelength band different from the wavelength band of the projection light PL is outputted as detection target light VL through a front-end section TP of a pen 70, which is a pointing element held by a user HU, and part of the detection target light VL is detected by the imaging section 50 (optical component to be detected out of detection target light is hereinafter called detection light (detection light DL)) for on-screen pointing position identification using the pen 70 (pointing element) held by the user HU.

Figure 2:
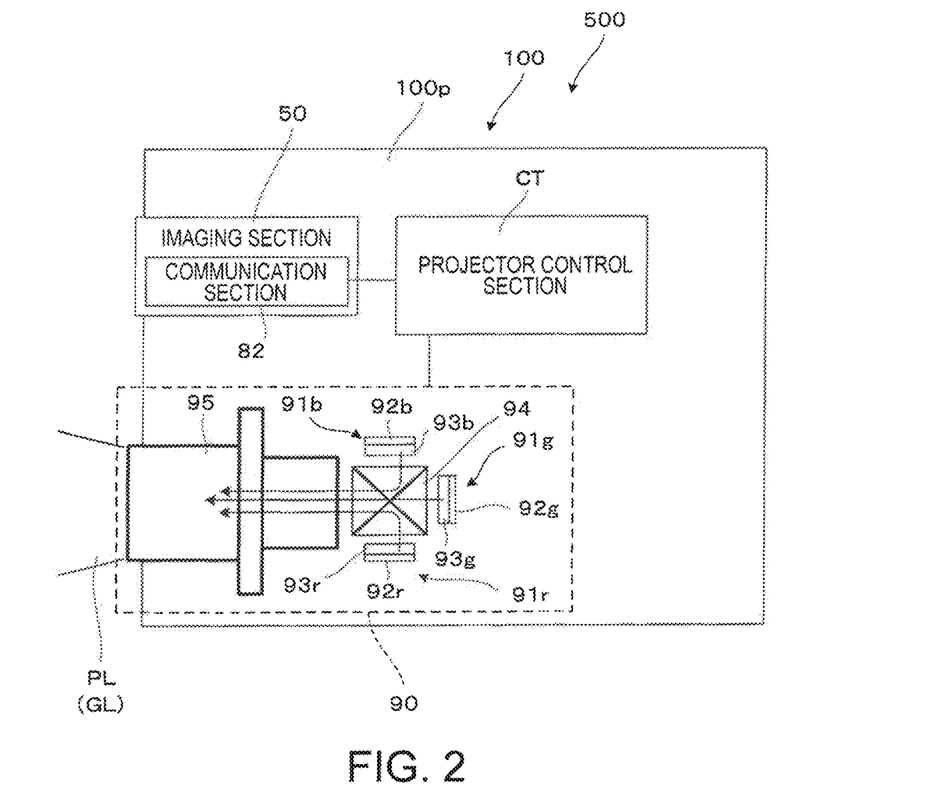
FIG. 2 shows the configuration of the projector system.

The projector main body 100p includes an image projecting section 90, which forms a variety of optical systems and includes, as image forming sections 91r, 91g, and 91b, which form red, green, and blue (R, G, and B) image light fluxes, light sources 92r, 92g, and 92b, which emit red, green, and blue (R, G, and B) light fluxes, and light modulators 93r, 93g, and 93b, which perform image modulation on a pixel matrix basis in correspondence with the light sources 92r, 92g, and 92b, and further includes a light combining prism 94, which combines color modulated light fluxes that are light fluxes modulated by the light modulators 93r, 93g, and 93b, and a projection optical system 95, which projects the combined light that is formed of the light fluxes combined with one another by the light combining prism 94, as schematically shown, for example, in FIG. 2, which shows the configuration of the optical systems. The thus configured image projecting section 90 projects an image formed of a color image on the screen SC. In addition to the components described above, the image projecting section 90 includes a relay optical system, field lenses, and other components but will not be illustrated or explained in the description. The light sources 92r, 92g, and 92b can each have any of a variety of configurations and can, for example, each be a laser light source, an LED light source, or even an organic EL (O-LED) light source. In particular, in a case where a self-luminous light source, such as an organic EL device, is used, the light sources can be configured as a video apparatus in which the light sources also play the role of light modulation. That is, the image forming sections 91r, 91g, and 91b can each be an integral unit that performs light generation and light modulation. In the case where the light sources (backlight) and the light modulators are separate from each other, the light modulators 93r, 93g, and 93b can, for example, each be a transmissive liquid crystal panel.

It is assumed in the description that the color light sources 92r, 92g, and 92b are each a laser light source by way of example. More specifically, the light sources 92r, 92g, and 92b are each assumed to be a narrow-band light source, such as that shown by the graph in FIG. 8. In other words, the wavelength band of the light emitted from each of the light sources 92r, 92g, and 92b is limited to a restricted range, and a visible wavelength band that is part of the entire visible wavelength band and is not contained in the projection light PL from the projector 100 is present in the light emitted from each of the light sources 92r, 92g, and 92b. In the present embodiment, the light containing the visible wavelength band that is not contained in the projection light PL is used as the detection target light VL outputted from the pen 70 (pointing element).

In addition to the image projecting section 90 including the projection optical system 95 and the other components described above, the projector main body 100p further includes a projector control section CT, which performs a variety of types of action control, such as image projection. The projector control section CT can accept information from the imaging section 50 and corrects the content of an image to be projected in consideration of the information from the imaging section 50 to allow what is called interactive image projection.

The imaging section 50 serves as a configuration for grasping the position where the projector 100 projects an image, and to this end, the imaging section 50 is so disposed that a camera lens system faces in accordance with the projection angle, the angle corresponding the projection distance, or any other factor in the image projection performed by the projector main body 100p. That is, the imaging section 50 is so disposed that even when the projector 100 is installed in a changing environment and the projection distance or any other factor therefore changes, the positional relationship between the projector main body 100p and the imaging section 50 does not change or the amount of change in the positional relationship, if any, is so slight that image correction and the like can be performed. The imaging section 50 captures an image of a projection image projected by the projector main body 100p and acquires image information. The projector main body 100p therefore allows calibration that associates the pixels of the image forming sections (pixel matrix in light modulation), which form the projector main body 100p, with the pixels of an imaging device 40 on the basis of the image information acquired by the imaging section 50. Further, in the present embodiment, the imaging section 50 can capture, as the detection light, light containing a wavelength band different from the wavelength band of the image light from the projector main body 100p in the interactive image projection.

Since the projector control section CT in the projector main body 100p and the imaging section 50 are configured as described above, the projector system 500 (or projector 100) allows what is called interactive image projection by using the calibration that associates the positions of the pixels of the image forming sections that form the projector main body 100p with the pixels of the imaging device 40.

Figure 3:
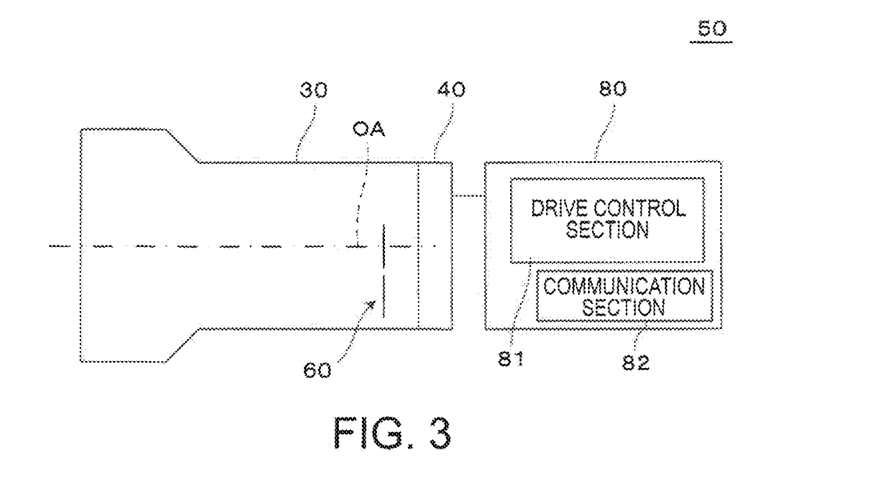
FIG. 3 shows the configuration of an imaging section.

The configuration of the imaging section 50 will be described below with reference to FIG. 3 and other figures. The imaging section 50 includes an imaging lens system 30 as well as the imaging device 40, which is a light receiving device, and a controller 80, as shown in FIG. 3.

The imaging lens system 30 brings an image on an object into focus on the imaging device 40 and has a plurality of lenses, stops, and other components accommodated in a lens barrel. An example of the configuration of the lenses, which form an essential part of the imaging lens system 30, and other components will be described later with reference to FIG. 4 and other figures.

The imaging device 40 is formed of a solid-state imaging device, for example, a CCD image sensor and a CMOS image sensor. The imaging device 40 is a light receiving device capable of receiving and sensing, as visible light, not only the projection light PL from the projector main body 100p (patterned image light GL at the time of the calibration, in particular) but also the detection target light VL, which is formed of a component in a visible wavelength band different from the visible wavelength band of the projection light PL.

The controller 80 controls the entire imaging section 50, communicates with the projector 100, on which the imaging section 50 is mounted, and performs other types of operation. To this end, the controller 80 includes a drive control section 81, which drives and controls the imaging device 40 and the imaging lens system 30, which form the imaging section 50, and a communication section 82, which performs information communication with the projector 100 (projector control section CT). In this case, the imaging device 40 and the imaging lens system 30 perform imaging in accordance with a drive signal from the drive control section 81 in the controller 80 and can therefore synchronize with a variety of actions of the projector 100, on which the imaging section 50 is mounted, via the communication section 82. That is, the imaging section 50 and the imaging lens system 30 can also operate in accordance with an instruction from the projector or any other main apparatus.

It is noted that the imaging section 50 can be incorporated as part of the projector 100, and that the imaging section 50 may, for example, instead be an imager separate from the projector 100.

It is now necessary to use information on an image captured by the imaging section 50 to associate the position of the pattern image PT, which is displayed by the patterned image light GL projected in the form of, for example, visible light from the projector main body 100p with the light emission position where the detection target light VL, for example, from a pointing element (or pointing device), such as the pen 70 (see FIG. 6), is emitted on the basis of the imaging information acquired by the imaging section 50. In the present embodiment, since the patterned image light GL and the detection target light VL are each light containing a visible wavelength band, the burden on optical design of the imaging section 50 can be reduced because the chromatic aberrations do not need to be suppressed over a wide wavelength band including the infrared wavelength band in addition to the visible wavelength band.

Figure 4:
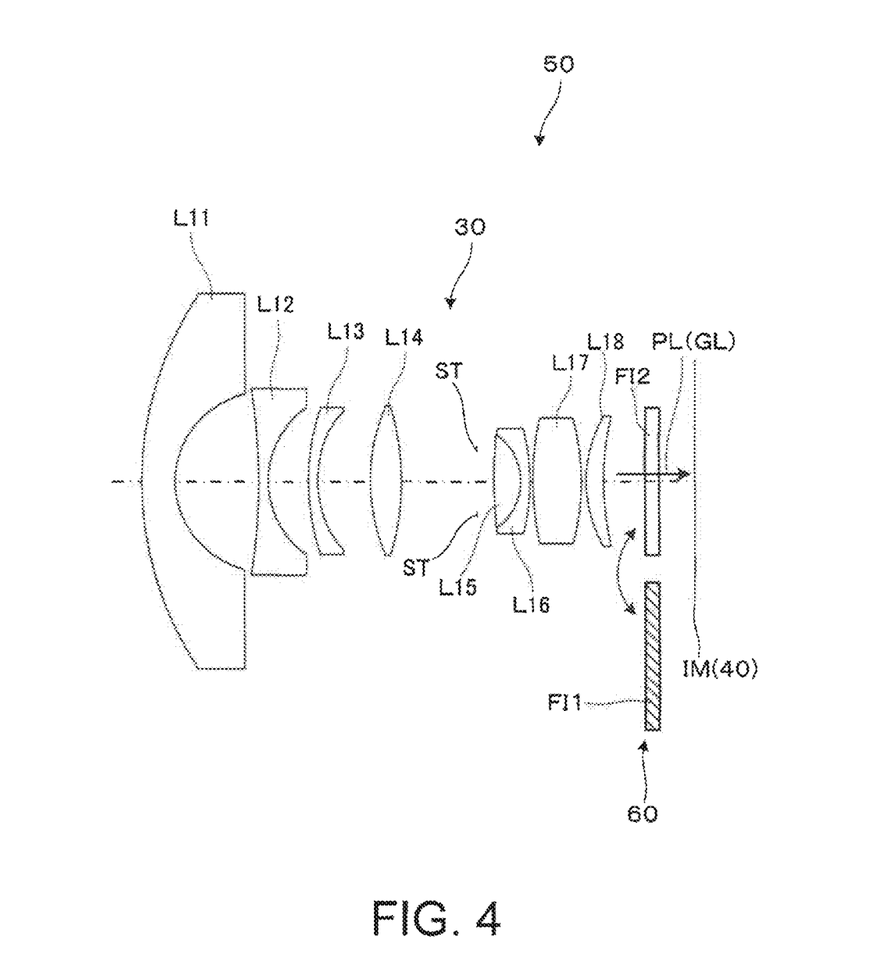
FIG. 4 shows an optical system that forms the imaging section and specifically shows the optical system at the time of the calibration.

The configuration of the optical system, in particular, of the imaging section 50 will be described below in detail with reference to FIG. 4. In FIG. 4, the imaging lens system 30, which forms the optical system of the imaging section 50 according to the present embodiment, includes a plurality of lenses (eight lenses L11 to L18 in the description by way of example), a stop ST, and an optical filter apparatus 60.

The plurality of lenses L11 to L18 form a fisheye-type lens and has a half viewing angle of, for example, 70° or greater, which is large enough to capture an image of the entire screen SC.

The optical filter apparatus 60 includes a first optical filter FI1 and a second optical filter FI2 and can insert and remove the optical filters FI1 and FI2 into and from the space between the lenses L11 to L18 and an image plane IM (image plane of imaging device 40) by using a stepper motor, a pinion, and other components that are not shown.

Figure 7:
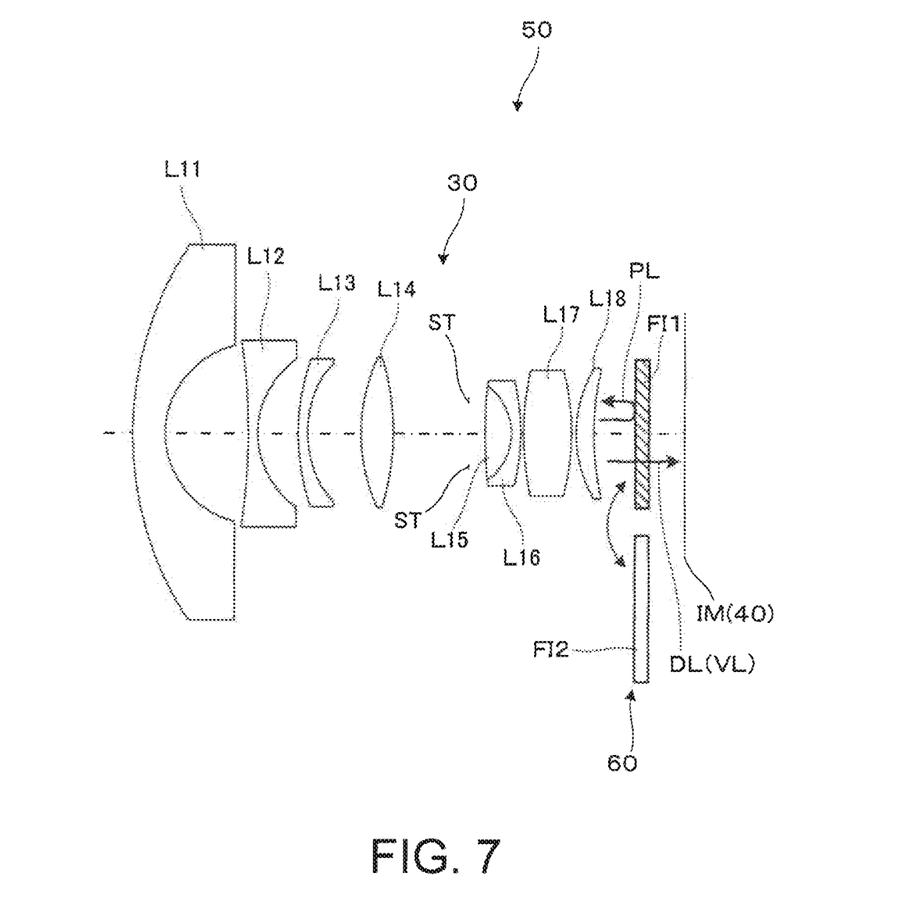
FIG. 7 shows the optical system that forms the imaging section and specifically shows the optical system at the time of image projection in the interactive situation.

Out of the components that form the optical filter apparatus 60, the first optical filter FI1 cuts off the optical components in the wavelength band corresponding to the projection light PL, which is image light, out of light containing the visible wavelength band but transmits the optical components containing the wavelength band corresponding to the detection target light VL outputted from the pen 70, which is the pointing element. That is, the first optical filter FI1 is a cut-out filter that cuts off the components in a specific wavelength band. The first optical filter FI1 is removed from the optical path at the time of the calibration, as shown in FIG. 4, and inserted into the optical path at the time of actual use of the projector, as shown in FIG. 7. The first optical filter FI1, at the time of actual use of the projector, therefore blocks the projection light PL, which is the image light outputted from the projector 100, but transmits the detection target light VL to allow the imaging device 40 to detect the detection light DL. In the description, the first optical filter FI1 has the spectral characteristic (spectral transmittance) expressed by the graph in FIG. 9 by way of example. More specifically, the first optical filter FI1 has optical transmittance of roughly 0% over the visible wavelength bands shown in FIG. 8 and corresponding to the wavelength bands of the light fluxes emitted from the light sources 92r, 92g, and 92b but transmits light containing the other visible wavelength bands at high transmittance. That is, the first optical filter FI1, which cuts off at least light containing the wavelength band contained in the projection light PL but is configured to be capable of transmitting the light containing the wavelength band of the detection target light VL, which is outputted from the pen 70, allows the imaging section 50 to receive the detection target light VL as the detection light DL.

The second optical filter FI2 is a cut-off filter that transmits only the light containing the wavelength band of the patterned image light GL, which forms the pattern image, but cuts off light containing the other wavelength bands. The second optical filter FI2 is disposed in the optical path at the time of the calibration, as shown in FIG. 4 and is removed from the optical path at the time of actual use of the projector, as shown in FIG. 7. The second optical filter FI2 therefore functions a pattern image light transmitting filter that allows the imaging device 40 to detect the patterned image light GL at the time of the calibration.

The optical filters FI1 and FI2 each conceivably have any of a variety of aspects, and it is typically conceivable that a film having the characteristic described above is formed, for example, on a light transmissive glass substrate to form the optical filter.

Actions performed in the calibration for associating the pixels in the projector main body 100p (pixels involved in light modulation) with the pixels in the imaging section 50 (pixels of imaging device 40) in the projector system 500 will be described below in detail with reference to FIGS. 1 to 5. It is noted that the calibration is a necessary process as a preliminary step that allows actions at the time of image projection (at the time of actual use of projector), such as image projection, in the interactive situation, as described above. In the following description, the term "at the time of image projection" does not mean a user's use of the projector different from the user's typical use of the projector, such as projection of the pattern image for the calibration, but means actual use (typical use) of the projector in which the user operates the projector in such a way that the projector projects an image that the user actually desires to project or any other image.

Figure 5:
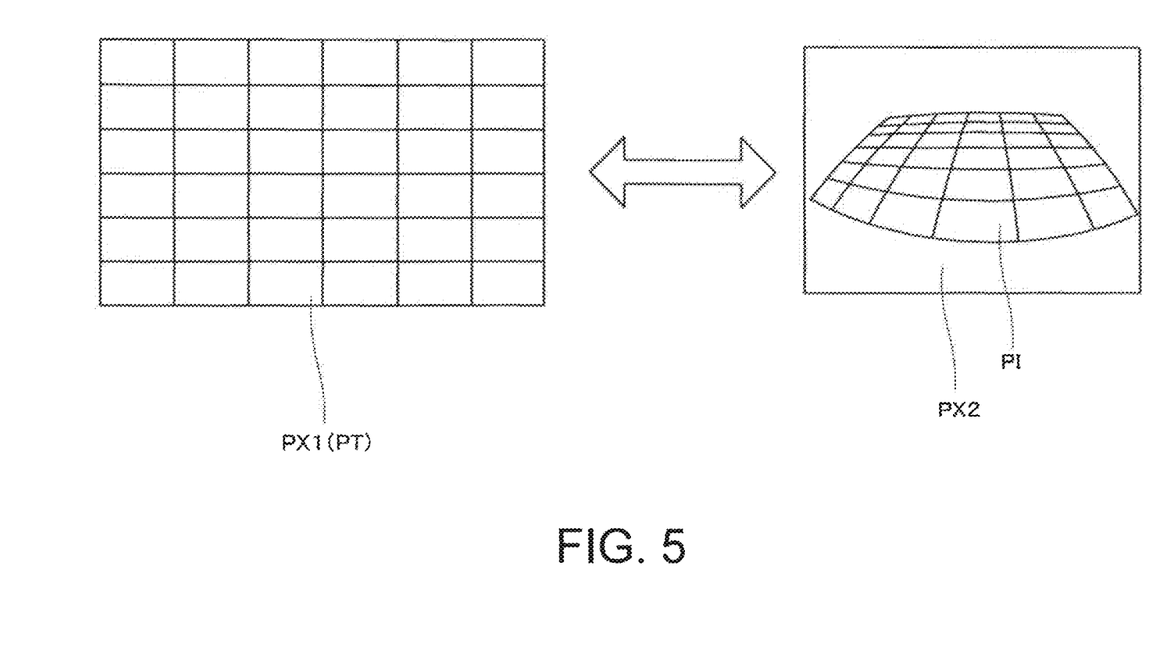
FIG. 5 describes associating operation for the calibration.

First, in the projector main body 100p, the image projecting section 90 projects the patterned image light GL for projecting the pattern image PT for calibration on the screen SC under the control of the projector control section CT. It is assumed in the description that the projected pattern image PT has a rectangular shape and has been associated with the pixel matrix in the light modulation (pixels involved in light modulation) in the projector main body 100p. Further, the patterned image light GL is light containing the green wavelength band, as described above, and the imaging section 50 captures an image of the pattern image PT projected on the screen SC (acquires information on patterned image light GL). The imaging section 50, which has the configuration described with reference to FIGS. 2, 3, and 4, transmits image information on the captured pattern image PT to the projector main body 100p. The projector main body 100p associates the information on the pattern image PT acquired by the imaging section 50 with information on the pixel matrix in the light modulation. FIG. 5 describes an example of the associating operation. It is assumed in the description that a pixel image PX1 shown on the left in FIG. 5 shows the pixel matrix in the light modulation in the projector main body 100p and has been associated with the pattern image PT on the screen SC. On the other hand, a pixel image PX2 shown on the right in FIG. 5 shows the pixel matrix in the imaging device 40, which is the light receiving device in the imaging section 50, and an image portion PI, which is a captured pattern image PT, has been captured in the pixel image PX2. The projector main body 100p associates each of the pixels that form the pixel image PX1 with each of the pixels in the portion that forms the pixel image PX2 and corresponds to the image portion PI to associate each position in the pattern image PT captured by the imaging section 50 with each position in the pixel matrix in the light modulation in the projector main body 100p, that is, each position in the projected image. In the pixel associating operation, the pixels typically do not correspond to each other in a one-to-one relationship due, for example, to the difference in the number of pixels between the pixel matrix (in light modulation) in the projector main body 100p and the pixel matrix of the imaging device 40, the difference in the number of pixels between the pixel matrix in the projector main body 100p and the pixel matrix within the range indicated by the image portion PI, and other factors. It is therefore necessary to carry out an associating process. For example, the associating process may be performed on a pixel basis (for example, a corresponding table may be created). Instead, the associating process may be carried out, for example, by specifying an associating function.

As described above, the projector main body 100p associates the image portion PI, which forms the pixel image PX2, which is information acquired by the imaging section 50 and representing the pattern image PT, and shows the image projection position, with the pixel image PX1, which shows the positions of the pixels involved in the light modulation to perform the calibration. The calibration allows identification of the pointed position based on the detection light DL detected by the imaging section 50, whereby interactive image projection can be performed.

Actions at the time of image projection in the projector system 500 (at the time of actual use of projector system) will be described below in detail with reference to FIGS. 6 and 7. In particular, actions in image projection in the interactive situation will be described in the following sections.

First, in this case, to allow writing, the user HU holds the pen 70, which is the pointing element, as shown in FIG. 6. When the user HU presses the front-end section TP of the pen 70 against the screen SC so that the pen 70 is turned on, the front-end section TP emits light. That is, the detection target light VL, which is not only light containing a visible wavelength band but also light containing a wavelength band different from the wavelength band of the projection light PL, is outputted through the front-end section TP. When part of the detection target light VL enters the imaging section 50, the imaging device 40 in the imaging section 50 detects the light as the detection light DL. When the imaging section 50 detects the detection light DL and a result of the detection is transmitted to the projector main body 100p, the projector main body 100p projects an image containing a point corresponding to the light emission position (light emission point) where the front-end section TP emits light on the basis of the result of the associating operation in the calibration, as shown in FIG. 6, in which part thereof is enlarged. That is, the projector main body 100p identifies not only the position of the pattern image PT (not displayed at the time of actual use of the projector system in FIG. 6) indicated by the broken light and corresponding to the image projection position based on the information acquired by the imaging section 50 and representing the patterned image light at the time of the calibration but also the light emission position where the detection light DL, which is detected by the imaging section 50 at the time of actual use of the projector system in the interactive situation, is emitted, and the projector main body 100p then performs image projection that reflects the information on the light emission position. That is, a specific position TPx, which is the light emission position where the detection light DL detected on the image is emitted, is associated with a position in the pattern image PT on the basis of the result of the associating operation at the time of the calibration, and an image including the front-end section TP is displayed as if the front-end section TP is located in the position described above, as shown in FIG. 6, in which part thereof is enlarged. To allow the actions described above, the projector control section CT, for example, performs a variety of types of image processing and the like.

In the above description, part of the detection target light VL forms the detection light DL to be detected by the imaging section 50. On the other hand, since the detection target light VL is visible light, the remainder of the detection target light VL reaches the user's eyes EY and other persons' eyes EY and is directly visually recognized. That is, the remainder of the detection target light VL enters the eyes of user HU who operates the pen 70 and viewers who view an image on the screen SC, as shown in FIG. 6. An image written by using the interactive function is, of course, also visually recognized.

In the detection action described above, in the imaging section 50, the first optical filter FI1 described above blocks the projection light PL, which is light containing a visible wavelength band, on the basis, for example, of reflection and absorption but transmits the detection target light VL, which is light that does not fall within the visible wavelength band, to allow the imaging device 40 to detect the detection light DL.

Figure 8:
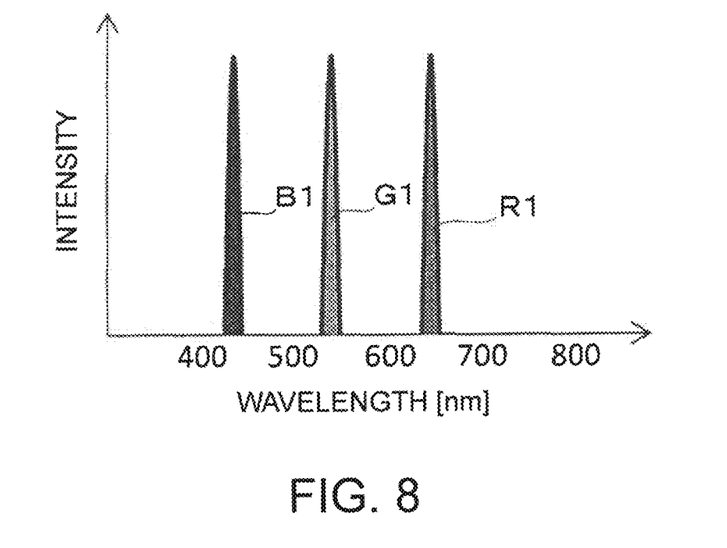
FIG. 8 is a graph showing an example of the spectrum of projection light from a projector.
Figure 9:
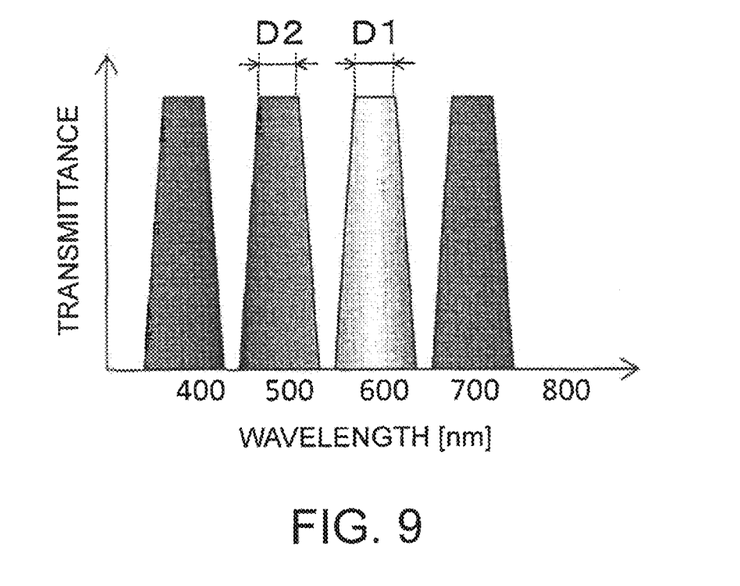
FIG. 9 is a graph showing an example of the spectral transmittance characteristic of an optical filter in the imaging section.

An example of the above-mentioned isolation (identification) of the projection light PL from the detection target light VL in terms of wavelength band will be described below with reference to FIGS. 8 and 9. The horizontal axis represents the wavelength of light (expressed in nm) in FIGS. 8 and 9, and the vertical represents the intensity of light in FIG. 8 and the transmittance at which a filter transmits light in FIG. 9. FIG. 8 shows the wavelength bands of the light fluxes emitted from the light sources 92r, 92g, and 92b of the projector 100, as described above, and it is assumed in the description that the graph in FIG. 8 shows an example of the spectrum of the projection light PL from the projector 100. That is, the red light source 92r emits light characterized by a first wavelength band R1 having a peak wavelength in the red wavelength band, the green light source 92g emits light characterized by a second wavelength band G1 having a peak wavelength in the green wavelength band, and the blue light source 92b emits light characterized by a third wavelength band B1 having a peak wavelength in the blue wavelength band. The projection light PL is formed of the light having the combination of the characteristics described above, and FIG. 8 therefore shows the spectrum of the projection light PL. On the other hand, FIG. 9 shows a graph illustrating an example of the spectral transmittance characteristic of the first optical filter FI1 in the imaging section 50, and the first optical filter FI1 does not transmit the components within the wavelength bands R1, G1, and B1 of the color light fluxes shown in FIG. 8 in correspondence with the characteristics of the light sources 92r, 92g, and 92b, that is, the characteristic of the projection light PL but transmits the components within the other wavelength bands within the visible wavelength band, as described above. That is, as shown in the graph of FIG. 9, the wavelength band between the first wavelength band R1 and the second wavelength band G1 and the wavelength band between the second wavelength band G1 and the third wavelength band B1 include, for example, detection light wavelength bands D1 and D2 usable as the wavelength band of the detection light, which is visible light. In other words, the pen 70, which is the pointing element, outputs light containing the detection light wavelength bands D1 and D2, which are the wavelength bands between the wavelength bands R1, G1, and B1 and between the wavelength bands G1 and B1 out of the wavelength bands R1, G1, and B1 of the color light fluxes. The imaging section 50 can therefore distinguish the projection light PL from the detection target light VL even during the radiation of the projection light PL and can therefore identify the position of the front-end section TP of the pen 70.

As described above, in the projector system 500 according to the present embodiment, the imaging section 50 receives, as the detection light DL, the components within the wavelength bands different from the wavelength bands contained in the projection light PL, which is not only light containing a visible wavelength band but the image light projected via the projection optical system. As a result, in the configuration that achieves an interactive projector, even when the detection light DL and the projection light PL are each formed of light containing a visible wavelength band, the imaging section 50 can reliably distinguish the detection light DL from the projection light PL and therefore detect only the detection light DL. In addition to this, since the detection target light VL (detection light DL), which is the target to be detected by the imaging section 50, can be formed of light that falls within the visible wavelength band, the imaging section 50, for example, does not need to be configured to have performance capable of capturing not only visible light but infrared light, whereby the imaging section 50 can be compact and simplified. Further, since the detection light DL (light outputted from pointing element), which is a target to be detected, is visible light, a person can directly visually recognize the light outputted from the pen 70, which is the pointing element.

Others

The invention is not limited to the embodiment described above and can be implemented in a variety of other aspects to the extent that they do not depart from the substance of the invention.

Figure 10:
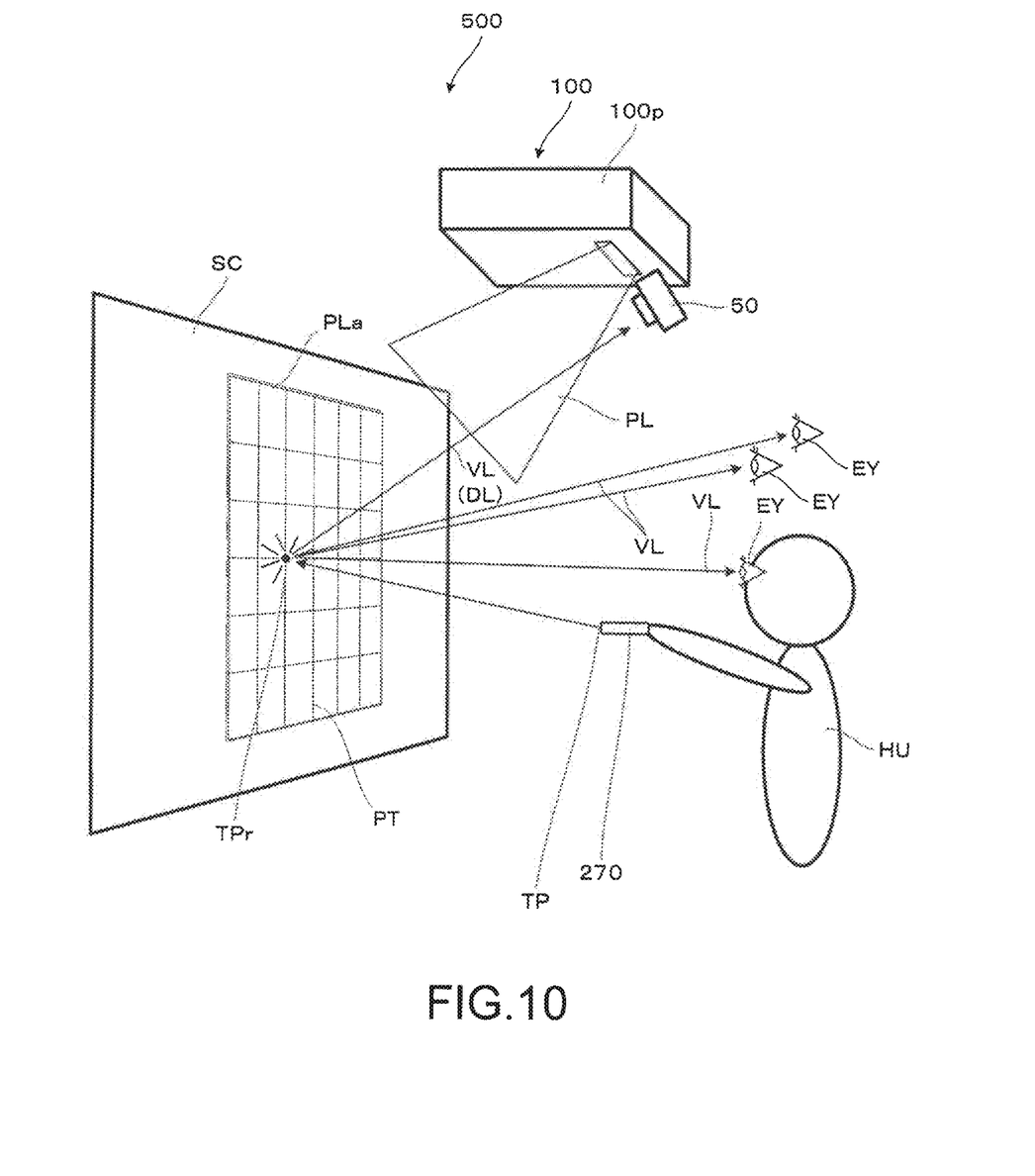
FIG. 10 shows another example of image projection in the interactive situation.

For example, in the example described above, the front-end section TP of the pen 70, which is the pointing element held by the user HU, emits light, as illustrated in FIG. 6. Instead, as another aspect, the pointing element may be a laser pointer 270, which serves as the pointing element and outputs the detection target light VL (detection light DL) containing a specific wavelength band, as illustrated in FIG. 10. In the present embodiment, the detection target light VL (detection light DL) can be visible light, as described above. That is, the user HU can directly visually recognize the detection target light VL on the screen SC. Therefore, the user HU can use the laser pointer 270 to output a laser beam as the detection target light VL through a front-end section TP of the laser pointer 270 from a position remote (separate) from the screen SC toward the screen SC, causes the imaging section 50 to detect the laser beam, and moves the position TPr of the outputted laser beam on the screen SC while visually recognizing the position TPr to achieve image projection in the interactive situation, as in the case described above. In the present embodiment, in which the projector 100 is installed above the screen SC and performs oblique projection (proximity projection), the shadow of the user HU is unlikely to be displayed on the screen SC even when the user HU is in a position close to the screen SC, moves the pointing element onto the screen SC, and uses it. However, the shadow may be undesirably displayed in some cases depending on the environment in which the projector 100 is installed, the height of the user HU, how close the user HU to the screen SC, and other factors. The remote operation described above can, for example, avoids such situations and allows image projection in the interactive situation to be maintained.

Figure 11:
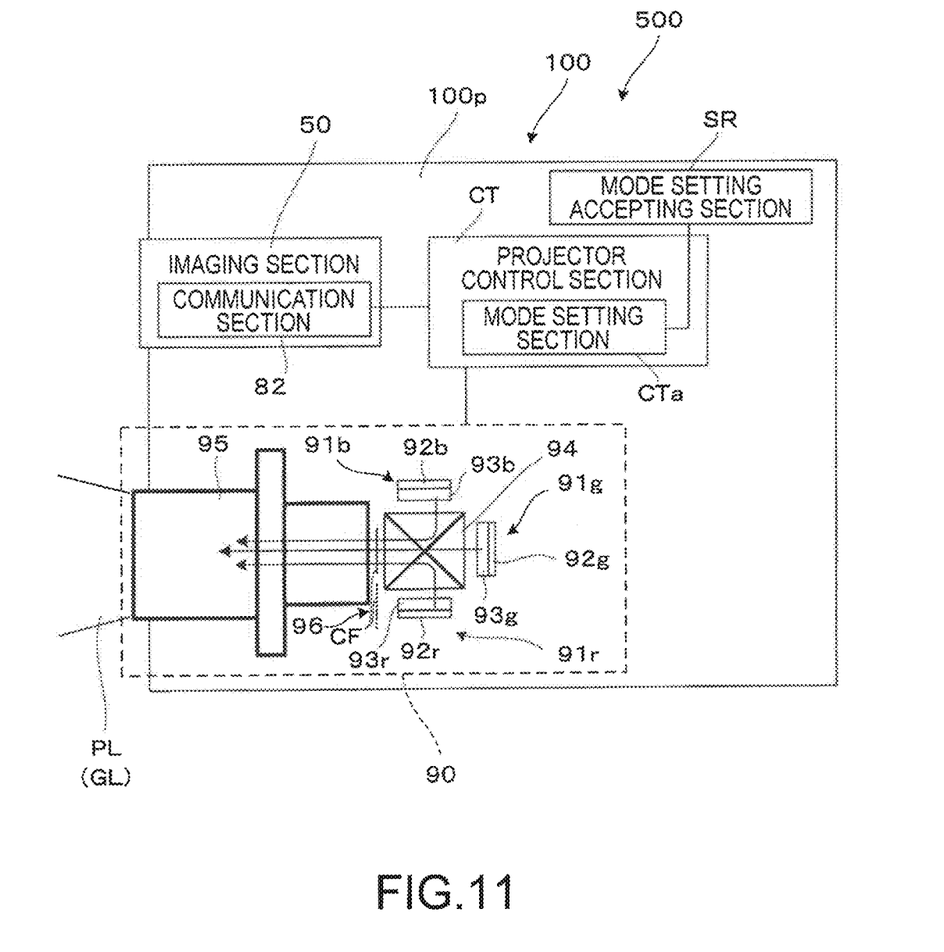
FIG. 11 shows the configuration of a projector system according a variation.

FIG. 11 shows the configuration of a projector system according to a variation. The projector system 500 according to the variation allows selection of image projection in a mode in which the interactive function described above is used at the time of image projection (at the time of actual use of projector system) or image projection in a mode in which the interactive function is not used. That is, the projector system 500 can accept an interactive mode setting instruction that instructs image display corresponding to a result of reception of light containing a specific wavelength band received by the imaging section 50. To this end, in the example shown in FIG. 11, among the components that form the projector system 500, the projector control section CT also functions as a mode setting section CTa connected to a mode setting accepting section SR. Further, among the components that form the projector system 500, the image projecting section 90 includes a cut-off filter apparatus 96, which inserts and removes a cut-off filter CF, which cuts off light containing the same wavelength band as the wavelength band to be received as the detection light DL. The cut-off filter CF is formed, for example, by forming a film having the characteristic described above on a glass substrate, and the cut-off filter apparatus 96 can insert and remove the cut-off filter CF, for example, by using a stepper motor, a pinion, and other components that are not shown. Among the components described above, the mode setting accepting section SR is formed, for example, of an externally provided button and accepts an instruction signal representing whether or not image projection in the mode using the interactive function (interactive mode) in response to the user's operation.

An example of a specific action of the mode setting in the projector system 500 according to the present variation will be described below. First, when the mode setting accepting section SR accepts an instruction signal relating to the mode setting, the instruction signal is transmitted to the projector control section CT, which serves as the mode setting section CTa. The mode setting section CTa drives and operates the cut-off filter apparatus 96 in response to the accepted instruction signal to insert or remove the cut-off filter CF into or from the optical path. That is, when the mode setting section CTa determines that an interactive mode setting that instructs use of the interactive function has been accepted, the projector control section CT, which serves as the mode setting section CTa, places the cut-off filter CF in the optical path and activates the imaging section 50 and orders the image projecting section 90 to performs image display corresponding to a result of the reception of the components within a specific wavelength band received by the imaging section 50 (that is, result of detection of detection light DL). On the other hand, when the mode setting accepting section SR accepts an instruction signal that cancels the interactive mode setting, the above-mentioned action of the imaging section 50 is terminated, and the cut-off filter CF is removed from the optical path.

As described above, inserting or removing the cut-off filter CF allows selection of whether or not image projection is performed in the interactive mode. Further, in this case, even when the light fluxes from the light sources contain the wavelength band of the detection target light VL (detection light DL), providing the cut-off filter CF can prevent the projection light PL from containing the wavelength band, whereby image projection in the interactive situation can be achieved. That is, the invention of the present application is applicable to even a case using a light source that is not a narrow-band light source, such as a laser light source, but emits light having a broad wavelength band.

Further, as an example of a narrow-band light source that forms the projector 100, it is conceivable to use a combination of a blue laser and a yellow phosphor. In this case, for example, it is conceivable that only the components within the wavelength band between the blue wavelength band and the green wavelength band (components between components of light from blue laser and components of light from yellow phosphor) are used as the detection target light VL (detection light DL) and caused to be received by the imaging section 50.

Figure 12:
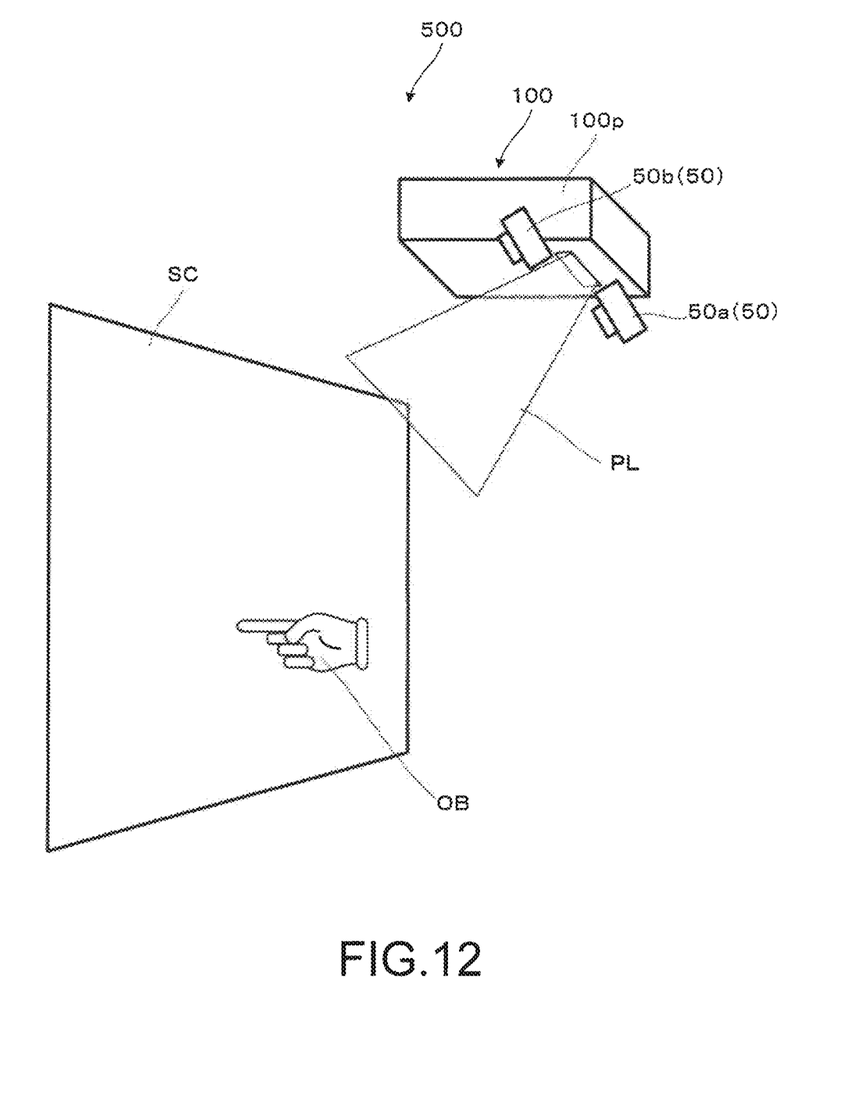
FIG. 12 shows a schematic configuration of a projector system according to another variation.

In addition to the case described above, for example, the projector system 500 may include two (a plurality of) imaging sections 50a and 50b, as in a variation having a schematic configuration of a projector system shown in FIG. 12. The imaging sections 50a and 50b (stereo cameras) are assumed to each, for example, have the same configuration as that of the imaging section 50 in the embodiment described above. Providing the two imaging sections 50a and 50b allows acquisition of parallax information (or stereo images). That is, mounting the two imaging sections allows more advanced position detection based on stereoscopic vision. In this case, for example, the projector control section CT (see FIG. 2) allows interactive image projection by causing the image projecting section 90 (see FIG. 2) to project an image that reflects information on the position of an object OB (user's fingertip, for example) detected by using the parallax information based on image information (detection light, which is visible light containing wavelength band different from wavelength band of projection light PL) acquired in imaging operation performed by the imaging sections 50a and 50b. Further, three or more imaging sections may be provided. In the detection of the object OB in the above description, the object OB not only reflects the components that form external light and belong to the wavelength band of the projection light PL but reflects the components that are not contained in the projection light PL, and the intended purpose is achieved when the latter components contain components that can be received as the detection light DL by the imaging section 50.

Figure 13:
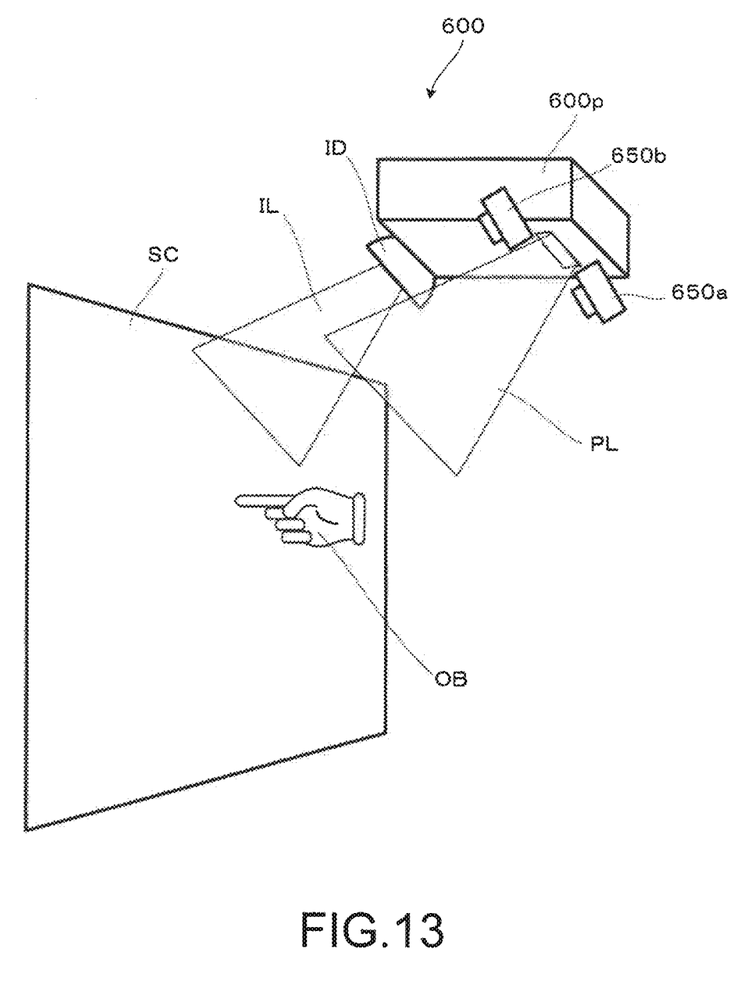
FIG. 13 shows a schematic configuration of a projector system according to Comparative Example.

As Comparative Example to be compared with the example of the projector system shown in FIG. 12, a projector system, such as that shown in FIG. 13, is conceivable. Specifically, a projector system 600 according to Comparative Example shown in FIG. 13 includes a projector main body 600p, an infrared light radiator ID, which radiates infrared light IL, and two (a plurality of) imaging sections 650a and 650b, which receive only the infrared light IL. The projector main body 600p differs from the projector main body 100p in the embodiment of the invention of the present application in that the visible wavelength band of the outputted projection light PL is not limited to a specific one and is any of a variety of wavelength bands in accordance, for example, with the type of the light sources or any other factor. Among the components that form the projector system 600, the infrared light radiator ID projects the infrared light IL toward the screen SC and radiates the range that covers the irradiated area PLa irradiated with the projection light PL (range over which position detection is performed). In this case, the imaging sections 650a and 650b receive the light produced by the infrared light radiator ID and having the components within a wavelength band out of the visible wavelength band but do not detect the projection light PL having components within a visible wavelength band. Therefore, for example, the two imaging sections 650a and 650b (stereo cameras) cut out only an actual object, such as the object OB, from video images produced by the projection light PL and sense the actual object to allow detection of the position of the object OB based on stereoscopic vision. In Comparative Example shown in FIG. 13, however, radiating the infrared light IL over the range where the position of the object OB is detected is a major premise. In contrast, in the embodiment of the invention of the present application, no infrared light needs to be used even in the case where stereo cameras are used, but the position detection is achieved by using visible light, as described above. That is, it is not necessary to provide the infrared light radiator ID shown in FIG. 13 or causing the infrared light radiator ID to radiate the infrared light IL and the imaging sections 650a and 650b to receive the infrared light IL.

Further, in the above description, the projector control section CT, the PC connectable to the projector 100, and other components carry out a variety of processes. The processes that the components described above are responsible for can be changed in a variety of manners. For example, it is conceivable that the PC carries out the process of identifying the image projection position based on the information acquired by the imaging section 50 and representing the projection light PL and the position based on the detection light DL detected by the imaging section 50. In other words, the PC or any other externally connected apparatus may perform part or entirety of the identification of the image projection position and the light emission position described above and the image projection control based on the identified positional relationship performed by the projector control section CT (PC or any other apparatus forms projector control section). Conversely, no PC or other apparatus is connected to the projector 100, but the projector control section CT, for example, can be responsible for all the processes (PC-less configuration).

In the above description, the pattern image PT is projected by using the patterned image light GL, which is formed of light containing the green wavelength band. The projection of the pattern image PT is, however, not necessarily performed by using light containing the green wavelength band but may conceivably be performed by using light containing another wavelength band. In this case, it is also conceivable to change the characteristic of the second optical filter FI2 in the optical filter apparatus 60 in a variety of manners.

Further, in the optical filter apparatus 60, the second optical filter FI2 may be replaced with a filter formed only of a glass substrate having no light transmission characteristic film but having transmittance at least over the entire visible wavelength band. Moreover, it is also conceivable to employ a configuration in which no second optical filter FI2 is provided, but only the insertable/removable first optical filter FI1 is provided, and no filter is placed at the filter placement location at the time of image projection (except the time of calibration). Further, the cut-off filter apparatus 96, which drives and moves the cut-off filter CF, which is illustrated in FIG. 11, may also be provided with a glass substrate inserted in place of the cut-off filter CF when the cut-off filter CF is removed from the optical path. Moreover, in the example shown in FIG. 11, the cut-off filter CF is inserted to a position between the light combining prism 94 and the projection optical system 95, but not necessarily, and can be placed in any of a variety of other positions along the optical path from the light sources to the projection optical system in consideration of influence of the cut-off filter on formation of the projection light PL, the characteristic of the detection target light VL, and other factors. Specifically, for example, the cut-off filter CF may be inserted to a position between the light sources 92r, 92g, 92b and the light modulators (panels) 93r, 93g, 93b.

In the example described above, only one pen 70 or laser pointer 270, each of which is the pointing element, is shown in FIGS. 6 and 10, but two or more pointing elements may be simultaneously used. For example, two pointing elements or two or more pointing elements that output light fluxes containing visible wavelength bands different from each other and other than the wavelength band of the projection light PL allow distinction between the detection target light fluxes (detection light fluxes) outputted from the pointing elements.

The imaging device 40, which is a light receiving device, may instead be formed, for example, of a device capable of sensing only light containing the green wavelength band, which corresponds to the patterned image light GL, and a device capable of sensing only the detection target light VL (detection light DL).

In the above description, the light sources, the light modulators, the projection optical system, and other components that form the projector main body 100p but have not been illustrated or described in detail can be achieved in a variety of manners. For example, the light sources are not limited to those described above and can, for example, be a high-pressure mercury lamp, and the light therefrom may be separated into light fluxes of the three colors. The light modulators are not limited to those described above and can have any of a variety of aspects, for example, are each formed of a liquid crystal panel with a color filter, a reflective liquid crystal panel, or a digital micromirror device.

The entire disclosure of Japanese Patent Application No. 2016-190772, filed Sep. 29, 2016 is expressly incorporated by reference herein.

What is claimed is:

1. A projector system comprising:
   a light source;
   a light modulator that modulates light from the light source to form image light;
   a projection optical system that projects the image light from the light modulator; and
   an imaging section that receives components within a visible wavelength band different from a wavelength band contained in the image light projected by the projection optical system, the components received as detection light for detection of a position on a projection image projected by the image light projected via the projection optical system, wherein
   the projection optical system emits light containing the visible wavelength band, and
   at least part of the visible wavelength band is not contained in the light emitted from the projection optical system.

2. The projector system according to claim 1, further comprising:
   a cut-off filter that is disposed in an optical path from the light source to the projection optical system and cuts off light containing the same wavelength band as a wavelength band to be received as the detection light by the imaging section.

3. The projector system according to claim 1, wherein the imaging section includes an optical filter that cuts off at least light containing the wavelength contained in the image light.

4. The projector system according to claim 1, further comprising:
   a projector control section that identifies an image projection position based on information on the image light acquired by the imaging section and a light emission position where the detection light detected by the imaging section is emitted and performs image projection control based on a relationship between the identified positions.

5. The projector system according to claim 1, wherein the projection optical system performs image projection that reflects information on a light emission position where the detection light detected by the imaging section is emitted.

6. The projector system according to claim 1, wherein calibration is so performed that image light for projecting a pattern image is projected and pixels involved in light modulation in which the light from the light source is modulated are associated with pixels of a light receiving device in the imaging section based on information produced by the imaging section having received the image light representing the pattern image.

7. The projector system according to claim 1, further comprising:
   a pointing element that produces light containing a wavelength band that is not contained in the image light projected via the projection optical system.

8. The projector system according to claim 1, further comprising:
   a mode setting accepting section that activates the imaging section and accepts an instruction that instructs setting of an interactive mode in which an image corresponding to a result of reception of components within a specific wavelength band received by the imaging section is displayed.

* * * * *